United States Patent [19]

Yoshimura

[11] Patent Number: 5,302,893
[45] Date of Patent: Apr. 12, 1994

[54] MAGNETIC ENCODER HAVING A MAGNETIC RECORDING MEDIUM CONTAINING BARIUM-FERRITE

[75] Inventor: Kuniaki Yoshimura, Kumagaya, Japan

[73] Assignee: Hitachi Metals, Ltd., Tokyo, Japan

[21] Appl. No.: 741,623

[22] Filed: Aug. 7, 1991

[30] Foreign Application Priority Data

Sep. 4, 1990 [JP] Japan .................................. 2-234118

[51] Int. Cl.$^5$ .......................... G01R 33/00; G01B 7/14
[52] U.S. Cl. ........................... 324/207.22; 324/207.24; 324/207.25; 324/174
[58] Field of Search ........... 324/172, 173, 174, 207.11, 324/207.2, 207.21, 207.22, 207.24, 207.25, 228; 252/62.51, 62.54, 62.63

[56] References Cited

U.S. PATENT DOCUMENTS 3,969,644  2/1975  Nowak .
3,986,206  10/1976  Fayling .
4,319,188  3/1982  Ito et al. ............................... 324/173

FOREIGN PATENT DOCUMENTS 0102518  7/1983  European Pat. Off. .
0203470  5/1986  European Pat. Off. .
0213732  7/1986  European Pat. Off. .
0235750  2/1987  European Pat. Off. .
58-117411  7/1983  Japan .
59-28220  2/1984  Japan .

Primary Examiner—Walter E. Snow
Attorney, Agent, or Firm—Finnegan, Henderson, Farabow, Garrett & Dunner

[57] ABSTRACT

A coated magnetic recording member for use in a magnetic encoder includes a non-magnetic substrate and a magnetic recording medium carried on the non-magnetic substrate. The magnetic recording medium of a magnetic film formed of a magnetic coating material which contains magnetic barium-ferrite powder. A magnetic encoder includes the magnetic recording member on which magnetic recording is conducted, and a magnetic sensor disposed in opposed relation to the magnetic recording medium.

4 Claims, 9 Drawing Sheets

FIG. 2A

AFFECTION OF Ba-FERRITE CONTENT IN MAGNETIC COATING MATERIAL ON OPTIMUM COERCIVE FORCE

Hc 1730 Oe : 65%

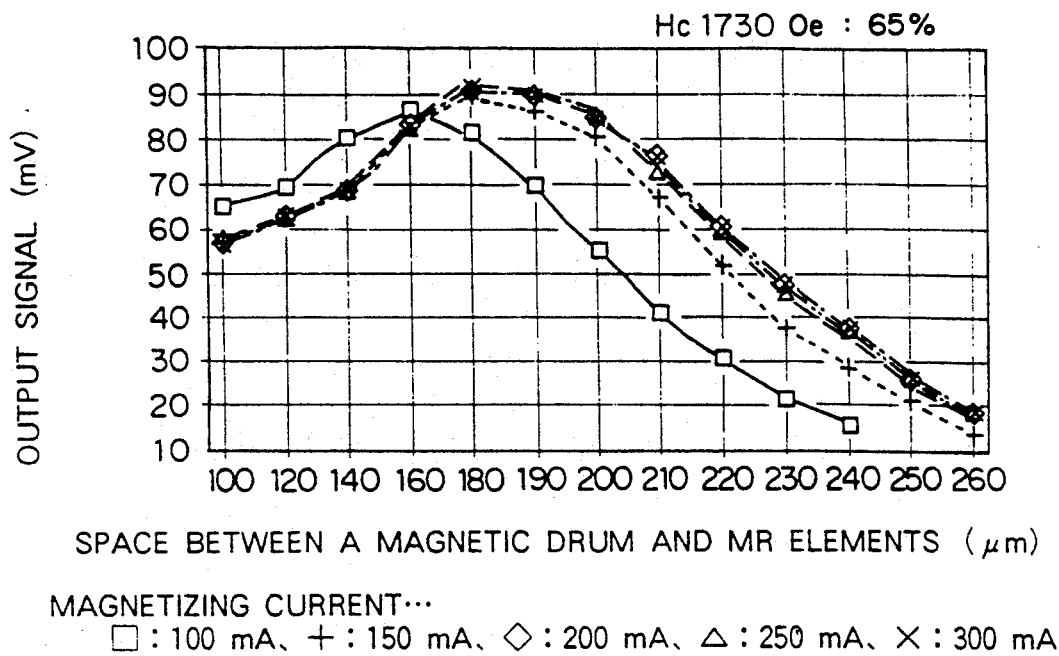

SPACE BETWEEN A MAGNETIC DRUM AND MR ELEMENTS (μm)

MAGNETIZING CURRENT⋯
□ : 100 mA, + : 150 mA, ◇ : 200 mA, △ : 250 mA, × : 300 mA

FIG. 2B

AFFECTION OF Ba-FERRITE CONTENT IN MAGNETIC COATING MATERIAL ON OPTIMUM COERCIVE FORCE

Hc 2710 Oe : 65%

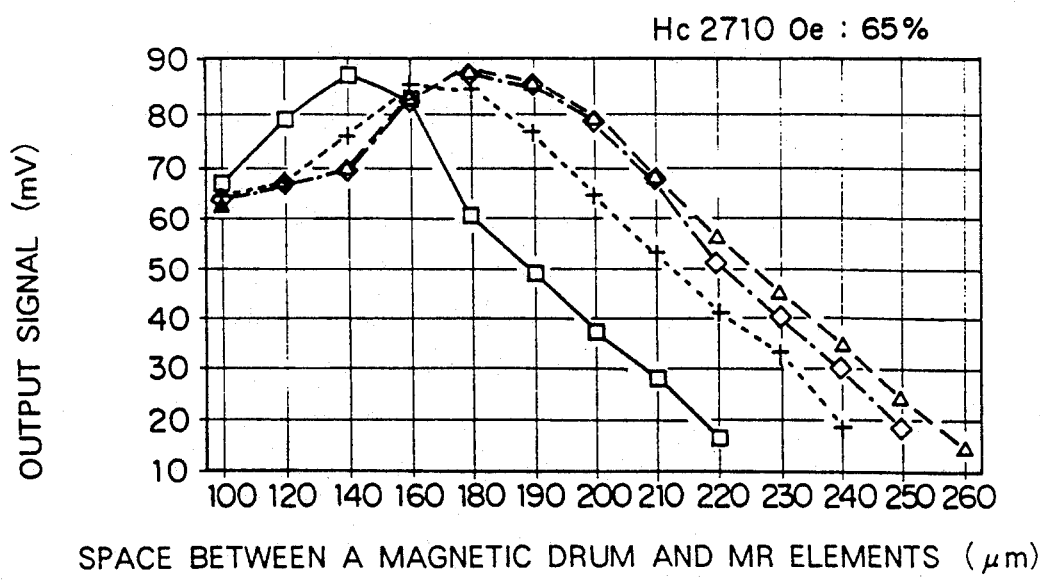

SPACE BETWEEN A MAGNETIC DRUM AND MR ELEMENTS (μm)

MAGNETIZING CURRENT⋯
□ : 100 mA, + : 150 mA, ◇ : 200 mA, △ : 250 mA

AFFECTION OF Ba-FERRITE CONTENT IN MAGNETIC COATING MATERIAL ON OPTIMUM COERCIVE FORCE

Hc 3910 Oe : 65%

SPACE BETWEEN A MAGNETIC DRUM AND MR ELEMENTS ($\mu$m)

MAGNETIZING CURRENT···
□ : 100 mA, + : 200 mA, ◇ : 300 mA, △ : 330 mA

LENGTH OF A PART OF THE MAGNETIC FILM (μm)

Spn, Spn+1 : SIGNS EACH OF WHICH INDICATES THE POSITION
   OF A SPACE PORTION TO THE SURFACE OF THE FILM $$\frac{|B_1|+|B_2|+|B_3|+|B_4|}{4} = |B| \frac{Spn + Spn+1}{2}$$

( $|B|$ : THE MAGNETIC FIELD INTENSITY
       AT THE MIDDLE BETWEEN Spn AND Spn+1 )

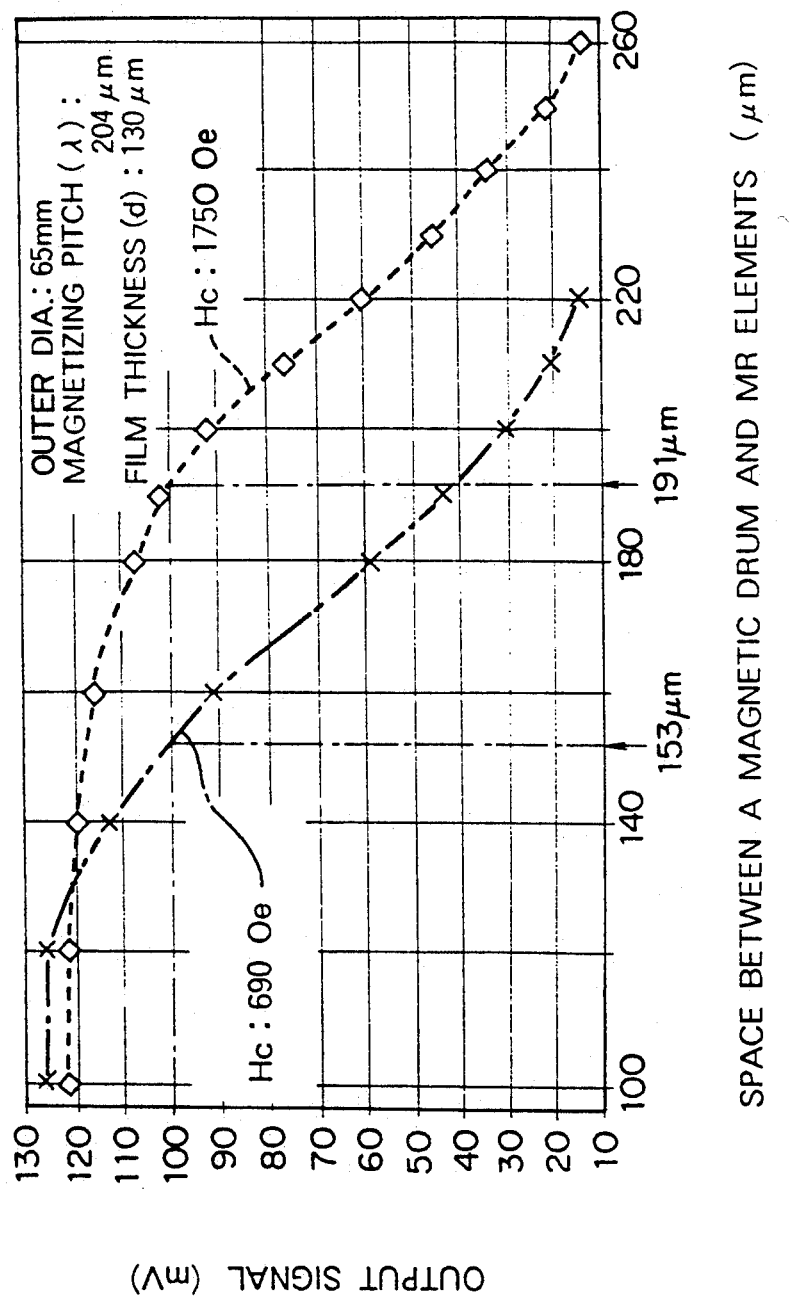

MAGNETIC ENCODER HAVING A MAGNETIC RECORDING MEDIUM CONTAINING BARIUM-FERRITE

BACKGROUND OF THE INVENTION

1. Industrial Field of the Invention

The present invention relates to a magnetic linear encoder for detecting a linear velocity or distance in a state of not being brought into contact with a magnetic resistance element or a magnetic rotary encoder for detecting a rotational angle or velocity in the same state, as well as a magnetic recorder for use in such a magnetic encoder.

2. Description of the Related Art

Magnetic encoders (magneto-electric converter) which employ a magneto resistance effect element made of a thin ferromagnetic film, have been commonly used in various fields due to their good durability in a surrounding atmosphere, wide operational temperature range and high response frequency. For example, magnetic encoder is used for controlling the rotational speed of a capstan motor in a VTR (video tape recorder) or the like. Generally speaking, magnetic encoders are used for positional or speed control in factory automatic (FA) equipments, such as servomotors, robots and NC machine tools, or in office automation (OA) equipments, such as computers and copying machines. In recent years, there has been an increasing demand for improving the accuracy of such equipments and intensive studies have thus been done to develop a magnetic encoder having with high resolution.

Conventional magnetic encoders are classified into a rotary type shown in FIG. 7A and a linear type shown in FIG. 7B. The magnetic encoder of either type includes a magnetic recorder 1 and a magnetic sensor 2 disposed in opposition to the magnetic recorder 1. The magnetic recorder 1 comprises a non-magnetic substrate 11 and a recording medium 12 which is a permanent magnetic material coated on the peripheral or flat surface of the non-magnetic substrate 11. The recording medium 12 is magnetized in a multipolar fashion at a magnetizing pitch $\lambda$ to form at least one magnetic signal track.

On the magnetic sensor 2, a plurality of magnetic resistance elements (hereinafter referred to MR elements) 22 with stripe are formed substantially parallel to the boundary lines between the adjacent signals on the magnetic signal track. The magnetic resistance elements are formed by processing a thin film of an Fe-Ni, Ni-Co or Fe-Ni-Co alloy coated on the surface of a non-magnetic substrate 21 using a photo-lithographic method.

When the magnetic signal track and the magnetic sensor 2 (disposed in opposed relation to the magnetic signal track) move relative to each other, the MR elements of the magnetic sensor are subjected to magnetic fields which change in an alternative fashion, and the resistance of each of the MR elements is changed synchronously with changes in the magnetic fields. To convert these changes in the resistance into an electric signal, a bridge structure may be provided in which a pair of MR elements are disposed at an interval of $\lambda/2$ in order to produce a differential output voltage. The recording medium 12 is formed by coating on the surface of a non-magnetic substrate a solution obtained by diluting a material composed of 60 to 70 wt. % of acicular magnetic particles and 40 to 30 wt. % of binder, such as an epoxy or polyurethane resin, in a solvent and then by drying the coated film. The acicular magnetic particles may be $\gamma$-$Fe_2O_3$, Co(cobalt)-$\gamma Fe_2O_3$ or other metal magnetic powders used in conventional magnetic recorder, such as in hard disks, floppy disks or VTRs.

It is noted that encoders are not always used under ideal environments. Among the above-described magnetic powders, Co-$\gamma Fe_2O_3$ has excellent durability and magnetic characteristics and is therefore widely used. Co-$\gamma Fe_2O_3$ magnetic powder is composed of acicular particles each of which has a saturation magnetization $\sigma s$ of 60 to 80 emu/g, a coercive force Hc of 250 to 1000 Oe, a particle length of 0.2 to 0.8 $\mu$m and an axial ratio of 5 to 10.

As the recording medium film becomes thinner, the diamagnetizing field becomes weaker, thus lessening demagnetization of the recording medium and generating a more effective magnetic force. However, as the film becomes thinner, the volume of the magnet is reduced, thereby reducing the generated energy. Therefore, presently the thickness of the film is set to about half of or is made substantially equal to the magnetizing pitch $\lambda$. For example, a recording medium having a film thickness of 80 to 100 $\mu$m is used relative to the magnetizing pitch $\lambda$ of 125 $\mu$m.

FIG. 8 shows a relationship between the space (or spacing) between a magnetic drum (the magnetic recorder of a rotary encoder) and MR elements and an output voltage. In this case, the magnetic drum has a 80 $\mu$m thick recording film made of Co-$\gamma Fe_2O_3$ having a residual magnetic flux density (Br) or 2,130 Gauss, a coercive force (Hc) of 800 oersted, and which is magnetized in a multipolar fashion by a pitch of 125 $\mu$m. According to the graph of FIG. 8, the range of the space which ensures the maximum output is between 60 to 80 $\mu$m, which is about one half of the magnetizing pitch 125 $\mu$m (see JP-A-58-117411 and JP-A-59-28220).

According to the aforementioned relationship between the space between the magnetic recording medium (made of Co-$\gamma Fe_2O_3$) and the MR elements and the output voltage, the space which ensures the maximum output voltage is about one half of the magnetizing pitch, and the range of the space which can generate the maximum output voltage is narrow. When it is desired to further reduce the magnetizing pitch, the space has to be reduced greatly, which may be difficult and cause contact between the recording member and the magnetic sensor during the operation of the magnetic encoder.

To overcome this problem, increasing the proportion of the magnetic powder in a coating film to improve the magnetic characteristics of the coating film has been considered. However, the present inventors noted when the coating material containing a high proportion of acicular magnetic powder, such as Co-$\gamma Fe_2O_3$, and a resin binder is thickly coated, cracks are readily generated during heating. The cracks in the recording medium are undesirable because they generate noise in an output signal or decrease the peak value. Therefore, when the acicular magnetic powder, such as Co-$\gamma Fe_2O_3$, is used to form a 80 to 100 $\mu$m thick magnetic film, the proportion of the magnetic powder in the solid content of the magnetic film should be limited to between 60 and 70 wt. % (25 and 35 vol. %). There is a limit to the improvement in the magnetic characteristics achieved by an increase in the proportion of the magnetic powder. A magnetic recording medium which contains 65 wt. % (30.3 vol. %) of Co-$\gamma Fe_2O_3$ magnetic powder exhibits a residual magnetic flux density Br of about 941 G because it is not magnetically oriented.

SUMMARY OF THE INVENTION

Accordingly, an object of the present invention is to provide a magnetic recording medium which enables a large space which assures the maximum output to be increased.

To this end, the invention provides a coating type magnetic recorder which has, on a non-magnetic substrate, a magnetic film as a magnetic recording medium made of a magnetic coating material containing magnetic barium (Ba) ferrite powder. The invention further provides a magnetic encoder which uses that coating type magnetic recording member.

BRIEF DESCRIPTION OF THE DRAWINGS

FIGS. 2A to 2C are graphs showing relationships between the spacing and the output voltage when the magnetizing current is changed in magnetic recording members having different coercive forces Hc;

FIG. 6 is a graph showing the relationship between the spacing and the output voltage in the present invention and in the conventional example;

DETAILED DESCRIPTION OF THE PREFERRED EMBODIMENTS

In the invention, the magnetic coating material is preferably composed of 35 to 65 vol. % of magnetic barium-ferrite powder and the balance of a binder resin.

Figure 9:
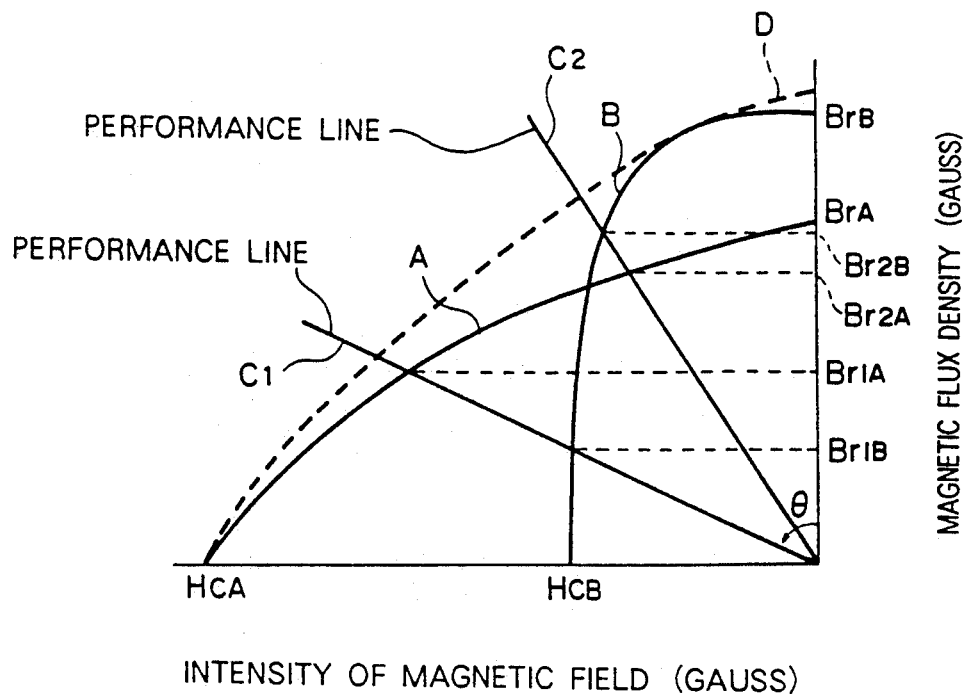
FIG. 9 is a graph showing the general relationship between the demagnetizing characteristics of the magnetic recording medium and the self-demagnetizing field.

FIG. 9 shows the typical examples of the demagnetizing characteristics of magnetic recording media. In FIG. 9, a curve A denotes the characteristics of a recording medium in which barium-ferrite is used, and a curve B denotes the characteristics of a recording medium in which $Co-\gamma Fe_2O_3$ is used. When the proportions of the both magnetic powders of barium-ferrite and $Co-\gamma Fe_2O_3$ are the same, the saturation magnetization ($\sigma_s$) and the residual magnetic flux density ($B_{rB}$) of the recording medium containing $Co-\gamma Fe_2O_3$ are larger than that of the recording medium containing barium-ferrite respectively.

In the magnetic recording medium, the residual magnetic flux density (Br) at the intersection of the demagnetization characteristic curve and the straight line (the performance line) based on the coefficient of self-demagnetization determined by the film thickness d of the recording medium and the recording wavelength (magnetizing pitch) λ represents the self-demagnetizing field and the residual magnetization. That is, in the case of a sine wave magnetization approximation, the coefficient of self-demagnetization N is expressed by the following equation:

$$N = -\frac{\mu_0 Hd}{Mr \sin\left(\frac{2\pi}{\lambda}\right)} = 1 - \frac{\lambda}{2\pi d}(1 - e^{-\frac{2\pi d}{\lambda}}) \qquad (1)$$

wherein Hd is the mean magnetic field in the section of the medium, and Mr is the magnetization.

The magnetization curve of the recording medium is graduated at the c.g.s. system, N is calculated from the thickness d and the recording pitch λ, and a straight line which ensures "tan θ = N" is drawn. The intersection of that straight line and the magnetization curve represents the self-demagnetizing field and the residual magnetization. For example, if the thickness and magnetizing pitch of the recording medium are respectively 80 μm and 125 μm, the coefficient of self-demagnetization N is 0.756 and hence θ = 37.1 degrees.

Two performance straight lines $C_1$ and $C_2$ based on the two different types of coefficient of self-demagnetization are assumed. With respect to the straight line $C_1$, the magnetomotive force $B_{R1A}$ of the magnetic recording medium in which barium-ferrite is used is larger than the magnetomotive force $B_{R1B}$ of the magnetic recording medium in which $Co-\gamma Fe_2O_3$ is used. With respect to the straight line $C_2$, the magnetomotive force $B_{R2B}$ of the magnetic recording medium in which $Co-\gamma Fe_2O_3$ is used is larger than the magnetomotive force $B_{R2A}$ of the magnetic recording medium in which barium-ferrite is used. Hence, in the present invention, a recording medium exhibiting the demagnetizing porperties indicated by a dotted line D in FIG. 9 is provided by increasing the proportion of the barium-ferrite magnetic powder in the recording medium, and the magnetizing pitch λ and the film thickness d are selected so that a magnetomotive force larger than that of the recording medium in which $Co-\gamma Fe_2O_3$ is used can be obtained at any inclination angle of the performance line.

That is, the inventors noted that the proportion of barium-ferrite magnetic powder in the magnetic coating material can be increased because cracks are not readily generated in the thickly coated film due to the hexagonal system of the magnetic particles, and thus accomplished the present invention. Proportions (or amount) of the magnetic powder in the magnetic coating material and the measured values of the corresponding magnetic characteristics of the coated film are shown in Table 1. At proportion of 30 vol. % (65 wt. %), practically sufficient magnetic characteristics can be obtained. Above 40 vol. % (75 wt. %), a residual magnetic flux density Br equal to or larger than that of the coated magnetic film of the conventional Co-$\gamma$Fe$_2$O$_3$ can be obtained. Above 65 vol. % (90 wt. %), the adhesive property of the magnetic powder in the coated film deteriorates in spite of the excellent magnetic characteristics, and the magnetic powder is thus easily peeled off. Hence, a desirable proportion of the barium-ferrite magnetic powder is 65 vol. % or less. The degree of adhesive property was evaluated by peeling off an adhesive tape adhered to a polyethylene sheet on which the magnetic coating material was coated.

a recording wavelength $\lambda$ of (is magnetized by a pitch $\lambda$ of) several tens to several thousands micron ($\mu$m), and the use of the above-described fine magnetic powder is thus not necessary.

In other words, magnetic powder having a particle size of 0.2 to 1.5 $\mu$m, commonly used for, for example, magnetic cards, is suitably used in the present invention, as stated above. Although the optimum coercive force Hc of the magnetic recording medium is determined by the saturated magnetic flux density Bs and gap of a

TABLE 1

| Proportion of magnetic powder in the coated film (wt %) | Hc (Oe) | $\sigma$s (emu/g) | $\sigma$r (emu/g) | $\sigma$r/$\sigma$s (emu/g) | Density of Film (g/cc) | Br (Gauss) | Bs (Gauss) |
|---|---|---|---|---|---|---|---|
| Ba-Ferrite |  |  |  |  |  |  |  |
| 65% | 1946 | 41.3 | 22.8 | 0.550 | 2.59 | 738 | 1340 |
| 75% | 1892 | 45.1 | 24.8 | 0.549 | 2.99 | 931 | 1696 |
| 80% | 1883 | 48.4 | 26.7 | 0.552 | 3.16 | 1061 | 1922 |
| 85% | 1880 | 50.5 | 27.5 | 0.545 | 3.14 | 1085 | 1991 |
| Characteristics of Ba-Ferrite: MC-617 | 1640 | 57.1 | — | 0.569 | — | — | — |
| Co-Ferrite |  |  |  |  |  |  |  |
| Co-$\gamma$Fe$_3$O$_3$ 65% | 825 | 48.8 | 31.6 | 0.647 | 2.37 | 941 | 1455 |
| Characteristics of Co-$\gamma$Fe$_2$O$_3$ | 690 | 76.5 | — | — | — | — | — |

*HC: Coercive Force.
$\sigma$s: Saturation Magnetization.
$\sigma$r: Residual Magnetization
Br: Residual Magnetic Flux Density.
Bs: Saturated Magnetic Flux Density In the present invention, barium-ferrite magnetic powder having a structure of the hexagonal system, mean particle size of 0.2 to 1.5 $\mu$m and a coercive force of 1,500 to 3,000 Oe is desirably used.

Barium-ferrite magnetic powder generally used as the permanent magnet material exhibits $\sigma$s of 50 to 60 emu/g and Hc of 1500 to 5000 Oe. Barium-ferrite magnetic powder has a structure of the hexagonal system and a particle size of 0.02 to 1.5 $\mu$m, although the particle size of the magnetic powder differs depending on the manufacturing method. Barium-ferrite magnetic powder is also used for vertical magnetic recording. Barium-ferrite magnetic powder of that type has a very small particle size of 0.08 to 0.2 $\mu$m. Such barium-ferrite magnetic powder is manufactured using a special process and is thus expensive. It is therefore difficult in terms of cost to use such a magnetic powder in magnetic encoders. Also, the use of such fine magnetic powder ensures magnetic recording media having good quality when the magnetic recording media are thin, like the vertical magnetic recording media. However, aggregation of fine magnetic powder easily occurs in a coating material when it is coated thickly, like the one provided in the present invention, and it is therefore impossible to manufacture a coated film having good quality. That is, in the present invention, the coated magnetic recording medium for a magnetic encoder has a writing head used for magnetic recording, if a ring head made of Fe-Al-Si alloy is used, it is set a value ranging from Hc 1500 Oe to 3000 Oe.

Examples of the present invention will now be described.

It is however to be noted that the present invention is not limited to the following examples.

Example 1

Magnetic coating materials whose solid content consisted of barium-ferrite magnetic powder (MC-617, manufactured by Toda Kogyo K.K., having a coercive force Hc of about 1730 Oe) and a binder resin were prepared. The proportions of barium-ferrite magnetic powder were respectively 65, 75, 80 and 85 wt. % (29.4, 39.9, 46.8 and 55.2 vol. % respectively), relative to the total weight percent of the solid content of the coating material, with balance of the binder resin. A polyvinyl butyral resin (BX-1, manufactured by Sekisui Kagaku K.K.), an epoxy resin (Epicoat 1007, Yuka Shell) and a phenol resin (Methylon (R) 75108, manufactured by BTL) were used as the binder resins. Cellosolve acetate and butyl cellosolve (both were manufactured by Taisei Kagaku K.K.) were used as the diluents. Table 2 shows the compositions of the individual magnetic coating materials and that of a magnetic coating material which uses Co-$\gamma$Fe$_2$O$_3$, manufactured for comparison.

TABLE 2

|  | Specific gravity g/cm | Magnetic coating material containing 65% of Ba ferrite ||||
|  |  | Weight g | Weight percentage wt % | Volume cm$^3$ | Volume percentage Vol % |
|---|---|---|---|---|---|
| Magnetic powder |  |  |  |  |  |
| Ba ferrite MC-617 | 5.2 | 462.8 | 31.91 | 89.0 | 8.16 |
| Resin |  |  |  |  |  |

TABLE 2-continued

| | Weight | | | | |
|---|---|---|---|---|---|
| Polyvinyl butyral resin BX-1 | 1.1 | 46.2 | 3.19 | 42.0 | 3.85 |
| Epoxy resin Epicoat 1007 | 1.19 | 101.4 | 6.99 | 85.2 | 7.81 |
| Phenol resin Methylon 75108 | 1.165 | 101.3 | 6.99 | 87.0 | 7.97 |
| Solvent | | | | | |
| Cellosolve acetate | 0.975 | 375.5 | 25.90 | 385.1 | 35.38 |
| Butyl cellosolve | 0.902 | 362.8 | 25.02 | 402.1 | 36.88 |
| | | 1450.0 | 100.00 | 1090.5 | 100.00 |

Solid content: 27.8 Vol %
Volatile matter: 72.201 Vol %
Proportion of magnetic powder: 29.4%

| Magnetic coating material containing 75% of Ba ferrite | | | | Magnetic coating material containing 80% of Ba ferrite | | | |
|---|---|---|---|---|---|---|---|
| Weight g | Weight percentage wt % | Volume cm³ | Volume percentage Vol % | Weight g | Weight percentage wt % | Volume cm³ | Volume percentage Vol % |
| 463.2 | 34.14 | 89.1 | 8.81 | 462.8 | 35.15 | 89.0 | 9.11 |
| 46.2 | 3.41 | 42.0 | 4.15 | 46.2 | 3.51 | 42.0 | 4.30 |
| 54.0 | 3.98 | 45.4 | 4.49 | 34.7 | 2.635 | 29.2 | 2.98 |
| 54.4 | 4.01 | 46.7 | 4.62 | 34.7 | 2.635 | 29.8 | 3.05 |
| 376.1 | 27.72 | 385.7 | 38.15 | 375.5 | 28.52 | 385.1 | 39.41 |
| 362.8 | 26.74 | 402.2 | 39.78 | 362.7 | 27.55 | 402.1 | 41.15 |
| 1356.7 | 100.00 | 1011.1 | 100.00 | 1316.6 | 100.00 | 977.2 | 100.00 |

Solid content: 22.1 Vol %  
Volatile matter: 77.93 Vol %  
Proportion of magnetic powder: 39.9%

Solid content: 19.4 Vol %  
Volatile matter: 80.56 Vol %  
Proportion of magnetic powder: 46.9%

| Magnetic coating material containing 85% of Ba ferrite | | | | Commonly used magnetic coating material containing 65% of Co—Fe (specific gravity: 4.7 g/cm³) | | | |
|---|---|---|---|---|---|---|---|
| Weight g | Weight percentage wt % | Volume cm³ | Volume percentage Vol % | Weight g | Weight percentage wt % | Volume cm³ | Volume percentage Vol % |
| 462.8 | 36.07 | 89.0 | 9.38 | 200 | 22.03 | 42.6 | 5.46 |
| 46.2 | 3.60 | 42.0 | 4.43 | 20 | 2.20 | 18.2 | 2.33 |
| 17.7 | 1.38 | 14.9 | 1.57 | 44 | 4.85 | 37.0 | 4.74 |
| 17.8 | 1.39 | 15.3 | 1.61 | 44 | 4.85 | 37.8 | 4.85 |
| 375.6 | 29.28 | 385.2 | 40.60 | 256 | 28.19 | 262.6 | 33.69 |
| 363.0 | 28.29 | 402.4 | 42.41 | 344 | 37.88 | 381.4 | 48.93 |
| 1283.1 | 100.00 | 948.8 | 100.00 | 908 | 100.00 | 779.4 | 100.00 |

Solid content: 17.0 Vol %  
Volatile matter: 83.01 Vol %  
Proportion of magnetic powder: 55.2%

Solid content: 17.4 Vol %  
Volatile matter: 82.62 Vol %  
Proportion of magnetic powder: 31.4%

After these magnetic coating materials were each coated on the outer peripheral surface of a cylindrical non-magnetic drum (made of JIS SUS 304) having an outer diameter of 65 mm, they were dry baked in the atmosphere for one hour and half at 200° C. to harden them. Thereafter, the surface of each of the hardened coated magnetic films was polished to obtain a recording medium having a thickness of 130±10 μm. The obtained recording medium was magnetized to form 1000 poles (by a pitch λ of about 204 μm) using a magnetic head. The magnetic head used for magnetizing the recording media was a ring head which used Fe-Al-Si (YEP-TG, manufactured by Hitachi Metals Ltd., having a saturated magnetic flux density of 8.9 KG) and whose gap was 40 μm.

Figure 1:
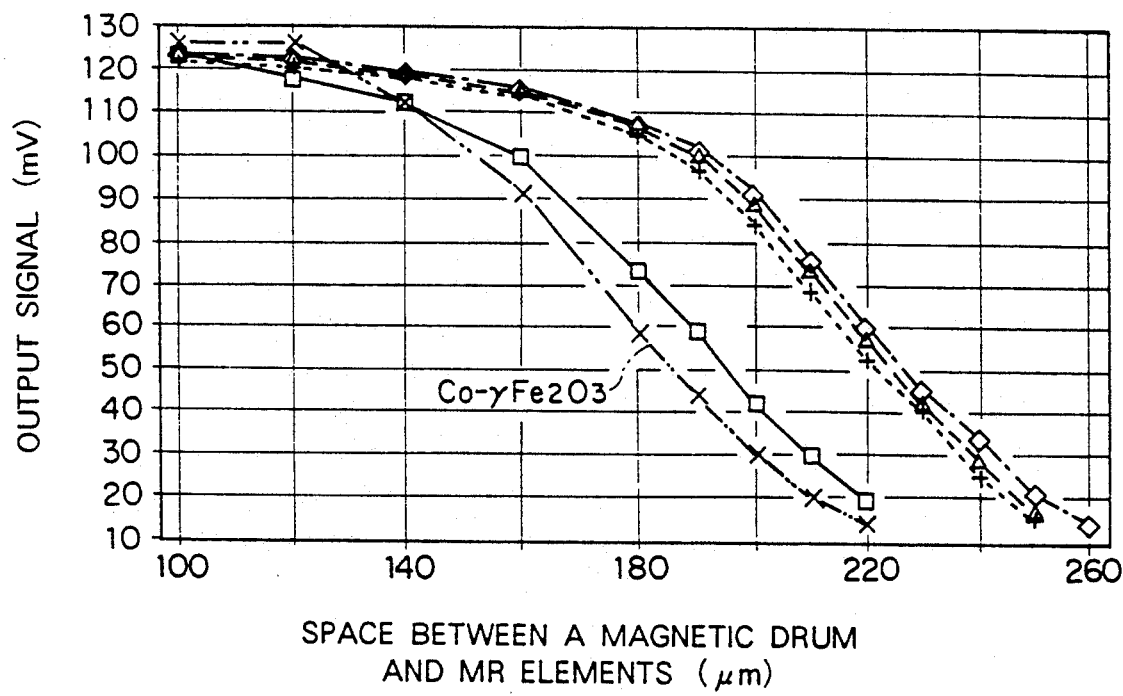
FIG. 1 is a graph showing relationships between the space and the output voltage when the proportion of barium ferrite in a magnetic recording medium is changed.

With respect to the individual magnetic drums in which different amounts of magnetic powder were present, how the output signal of the magnetic sensor changed by a change in the spacing was measured. FIG. 1 shows the results of the measurement. As can be seen from FIG. 1, the spacing which ensured the sufficient level of output signal increased in the magnetic drums which contained 75 to 85 wt. % (40 to 55 vol. %) of magnetic powder, as compared with the conventional magnetic drum which contained Co-γFe₂O₃.

Example 2

An epoxy resin type binder resin was added to barium-ferrite powders respectively having a coercive force Hc of 1730, 2710 and 3910 Oe, and the mixtures were then mixed by means of a kneader or a sand mill. The magnetic powders were present in an amount of 65 wt. % based on the total weight of the solid content of the coating material. The barium-ferrite magnetic powder had the hexagonal system. Table 3 shows the characteristics of the individual magnetic powders and those of the coated magnetic films. Cellosolve acetate was mainly used as the diluent.

These magnetic coating materials were coated on the non-magnetic drum in the same manner as that of Example 1 to obtain magnetic drums having a diameter of 65 mm. The coated magnetic films were magnetized to form 1000 poles, as in the case of Example 1.

TABLE 3

| Magnetic powder characteristics | | | | |
|---|---|---|---|---|
| | Hc | σs | σr/σs | Average particle size | Specific surface area (m²/g) |
| Co-γFe₂O₃ Conventional | 690 | 76.5 | | | 27.6 |

TABLE 3-continued

| powder | | | | | |
|---|---|---|---|---|---|
| MC-740 Ba ferrite Toda Kogyo KK | 3910 | 57.5 | 0.630 | 0.78 | 4.96 |
| MC-127 Ba ferrite Toda Kogyo KK | 2710 | 54.0 | 0.620 | 0.76 | 5.29 |
| MC-617 Ba ferrite Toda Kogyo KK | 1730 | 57.1 | 0.589 | 0.76 | 4.95 |

| Magnetic coating material characteristics | | | | | |
|---|---|---|---|---|---|
| Hc (Oe) | $\sigma s$ (emu/g) | $\sigma r$ (emu/g) | $\sigma r/\sigma s$ | Density of the film (g/CC) | Br (Gauss) | Proportion (wt %) |
| 913 | 54.0 | 35.7 | 0.662 | 2.34 | 1052 | 65 |
| 3725 | 40.8 | 23.3 | 0.572 | 2.62 | 771 | 65 |
| 2932 | 41.0 | 23.9 | 0.584 | 2.58 | 777 | 65 |
| 2042 | 43.5 | 24.2 | 0.558 | 2.67 | 812 | 65 |

Figure 2C:
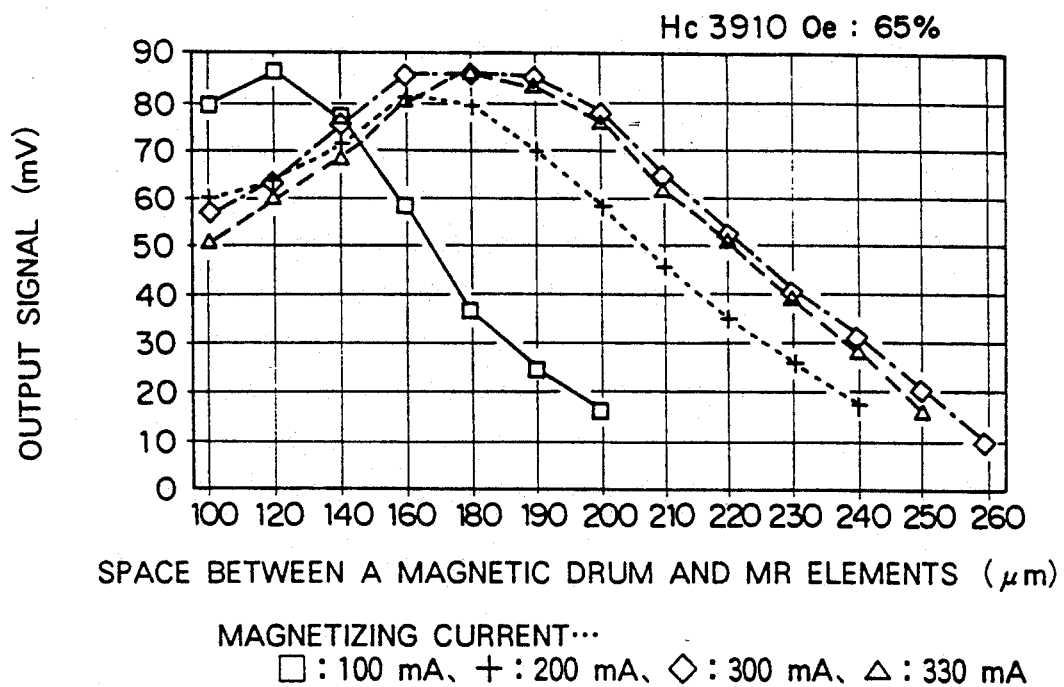

Next, the magnetic drums which used barium-ferrite magnetic coating materials having different coercive force (Hc) were magnetized using different currents, and the relationship between the output signal of the magnetic sensor and the spacing was examined. FIGS. 2A to 2C show the results of the examination. As shown in FIGS. 2A and 2B, in the case of the magnetic drums which used magnetic powder having a coercive force Hc of 1730 Oe and 2710 Oe, changes in the output signal caused by the change in the spacing disappeared when the writing current was 200 mA or above. This means that the magnetic drums were magnetized sufficiently. In contrast, in the case of a coating film which used magnetic powder having a coercive force Hc of 3910 Oe, when the writing current was 300 mA or less, different output signals were obtained at the same spacing, as shown in FIG. 2C. This indicates that magnetization was insufficient. The magnetizing current of the normally used magnetizing magnetic head is about 200 mA at the maximum. At a current higher than this current, the head will be saturated, and writing may not be possible. Hence, a desired coercive force Hc of the barium-ferrite magnetic powder is between 1500 and 3000 Oe.

Example 3

To construct a magnetic encoder, a magnetic sensor with the MR elements provided thereon is disposed in opposed relation to a recording medium at an adequate interval (or space), as stated above. In the case of the MR elements which employ Permalloy which is Fe-Ni alloy, a magnetic field ($H_k'$) of 40 to 50 G is required to saturate the coefficient of change in the resistance ($\Delta R/R$). Hence, the present inventors conducted magnetic field simulation by the finite element method with the magnetizing pitch $\lambda$, the spacing x, the thickness d of the recording medium and the demagnetizing curve of the recording medium taken into consideration to investigate the relationship between these factors.

Figure 3A:
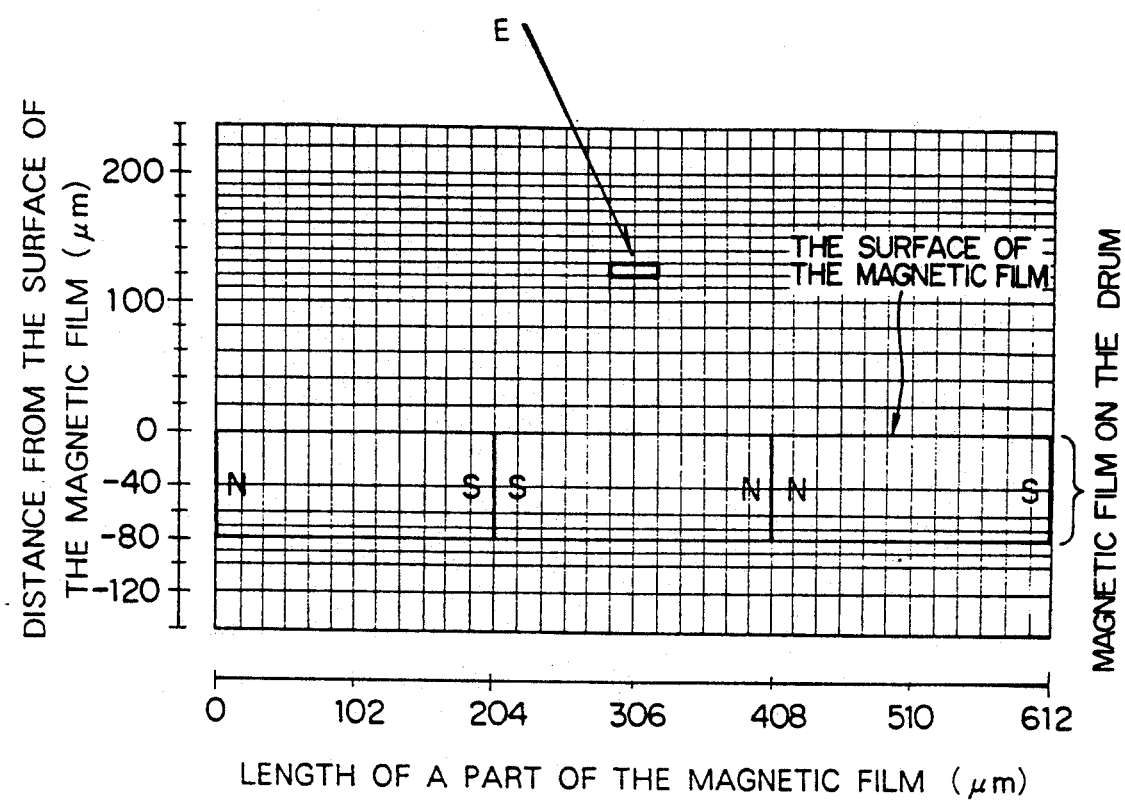
FIG. 3A is an element detail drawing of the magnetic drum for the magnetic field simulation.
Figure 3B:
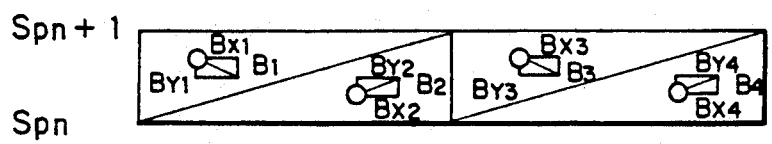
FIG. 3B is an enlarged drawing of the elements E in FIG. 3A, with an equation to calculate the magnetic field intensity.

FIG. 3A is an element detail drawing of the magnetic drum for the magnetic field simulation. FIG. 3B is an enlarged drawing of the elements E in FIG. 3A, with an equation to calculate the magnetic field intensity. In this example, three bar magnets which formed the magnetized portion were aligned alternately with the S pole of the first bar magnet being connected to the S pole of the second bar magnet and so on, and the space (located above the magnets) and the substrate (located below the magnets) were regarded as the non-magnetic air gaps. Although the normal thickness of the coated magnetic film is about 80 μm, the thickness of the magnets (which corresponds to the thickness of the film) was changed to calculate the magnetic field intensity.

With respect to the coated magnetic film which used the conventional Co-$\gamma Fe_2O_3$ magnetic coating material, the relationship between the surface magnetic field and d/$\lambda$ was calculated in the magnetic field simulation by the finite element method. The results of the calculation are shown in FIG. 4.

Figure 4:
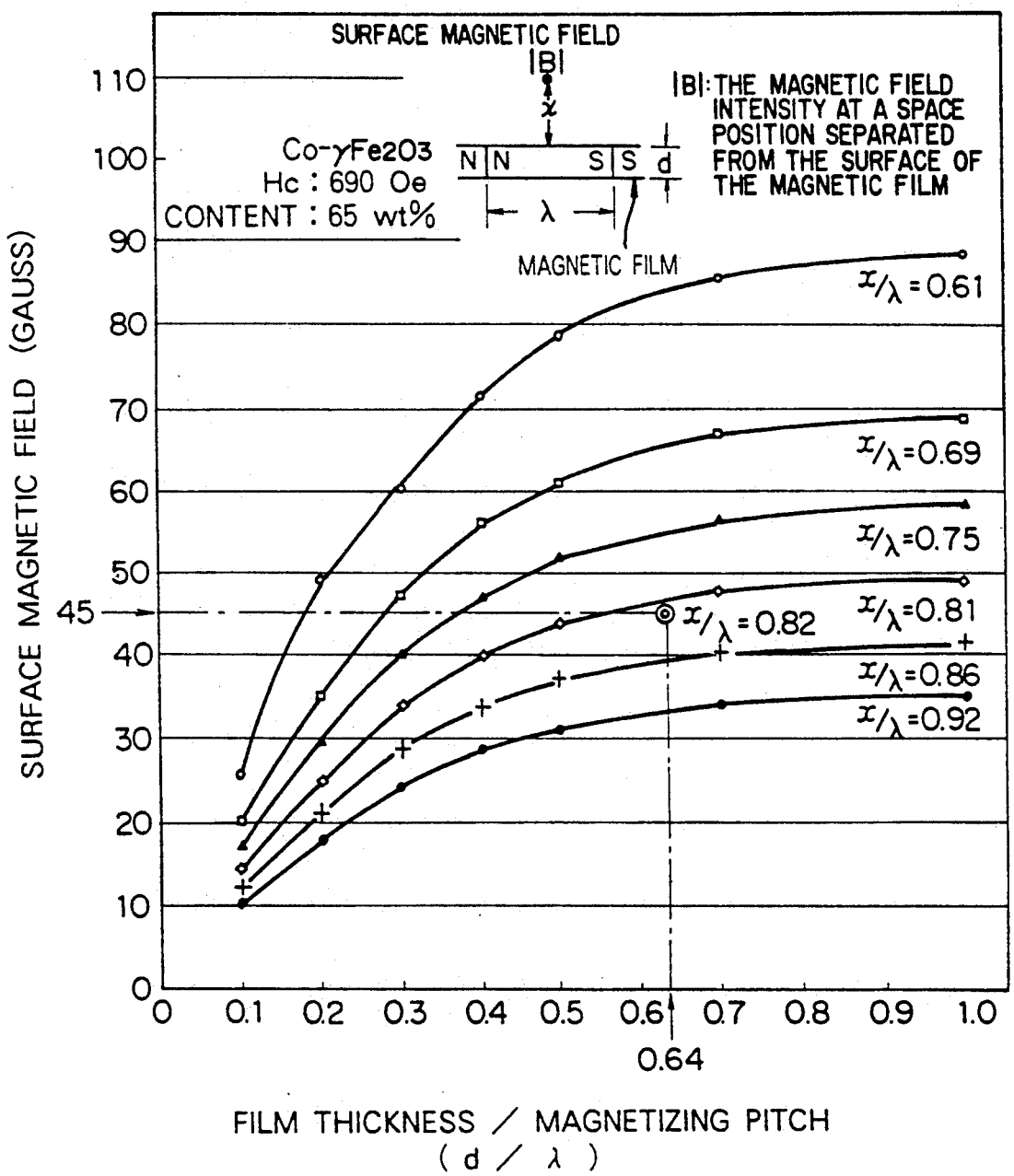
FIG. 4 is a graph showing the results of the magnetic field analysis which uses a conventional magnetic recording member in terms of the relationship between the surface magnetic field and d/λ (film thickness/magnetizing pitch)

From FIGS. 3 and 4, it is clear that the surface magnetic field tends to be saturated at a given wavelength (magnetizing pitch $\lambda$) as the thickness d increases (i.e., as d/$\lambda$ increases). As stated above, the MR elements are saturated at 40 to 50 G. If it is assumed that the magnetic field is at 45 G which is the central value of that range, and if the magnetizing pitch $\lambda$=204 μm and the film thickness d=130 μm, d/$\lambda$=0.64. From these values, x/$\lambda$=0.82, as can be seen in FIG. 4. That is, the optimum space $S_P$ under the above condtiions is $\lambda \times 0.82$.

Figure 5:
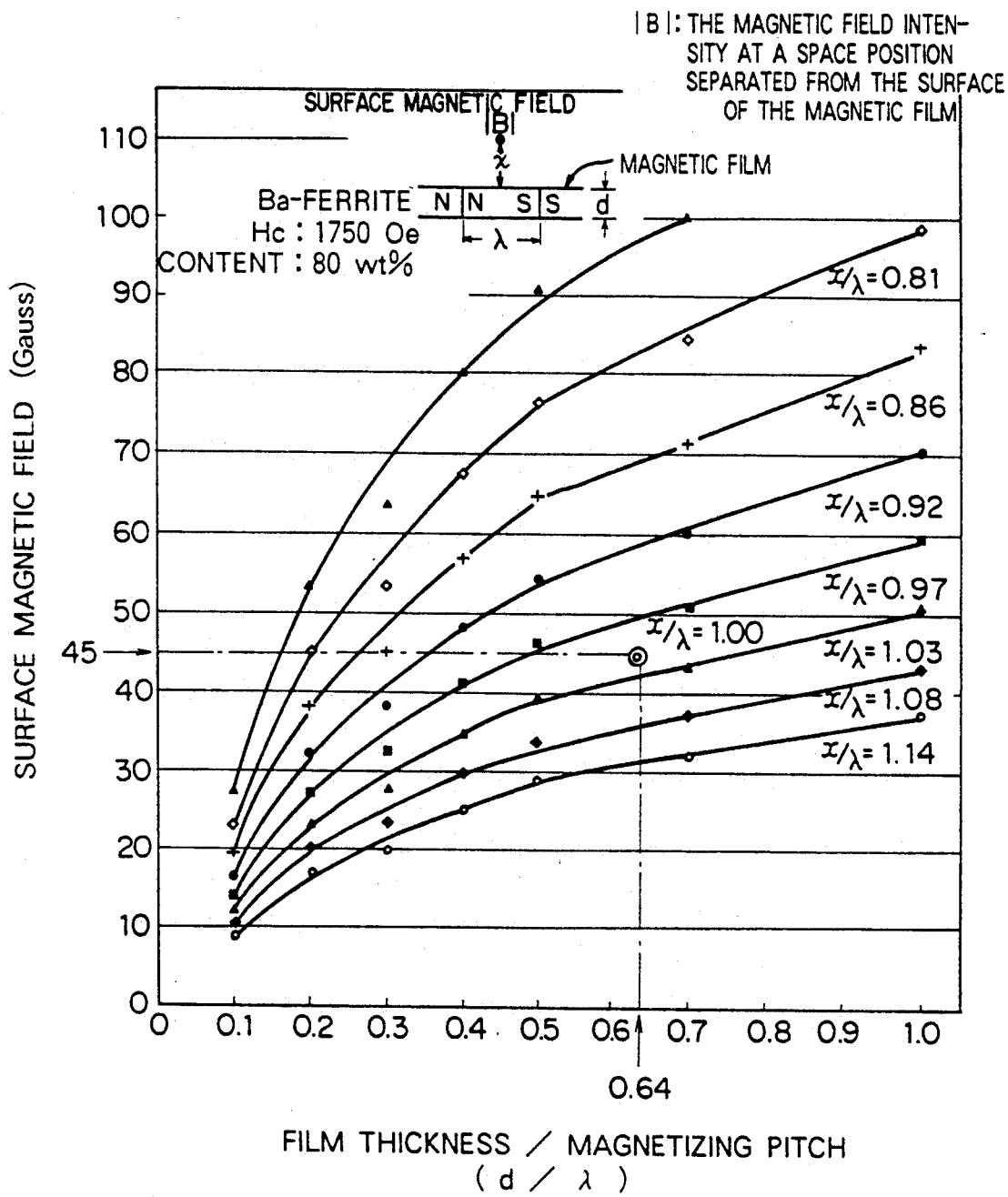
FIG. 5 is a graph showing the results of the magnetic field analysis which uses a magnetic recording member according to the present invention in terms of the relationship between the surface magnetic field and d/λ (film thickness/magnetizing pitch)
Figure 7A:
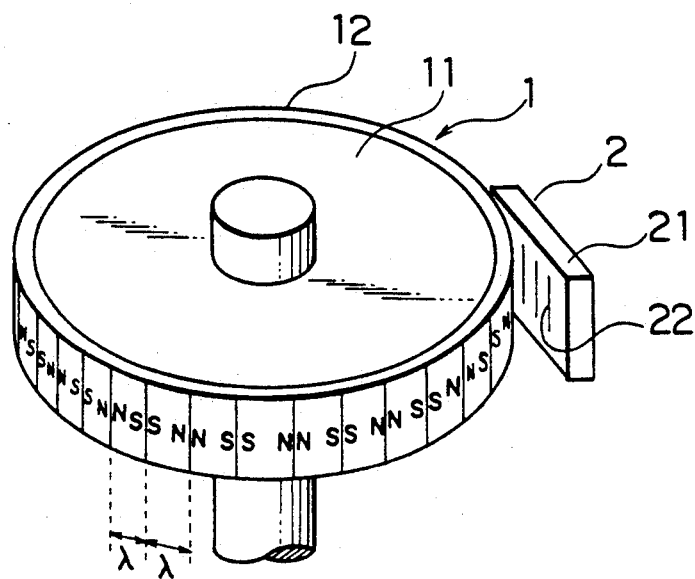
FIGS. 7A and 7B are respectively perspective views of a rotary encoder and a linear encoder, showing the opposing relationship between a magnetic recording member and a magnetic sensor.
Figure 7B:
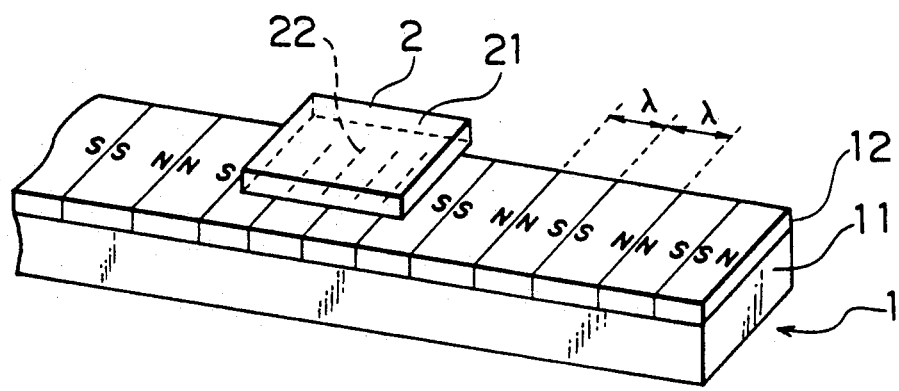
Figure 8:
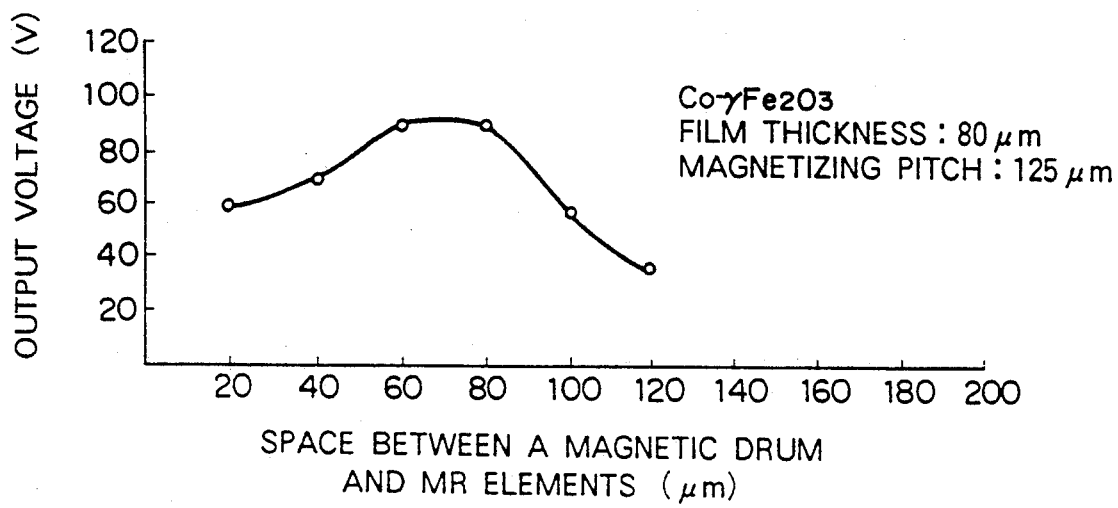
FIG. 8 is a graph showing the relationship between the spacing and the output voltage in a conventional example.

FIG. 5 shows the results of the magnetic field simulation of the coated magnetic film formed of the magnetic coating material which uses the barium-ferrite magnetic powder of the present invention.

As can be seen from FIG. 5, the surface magnetic field tends to be saturated when d/$\lambda$ is 0.5 or more. Also, in the magnetic field range of 40 to 50 G, it is desired that space x be set such that $x \geq \lambda$. In the results of the simulation shown in FIG. 5 conducted on the barium-ferrite magnetic coating material, if the surface magnetic field is at 45 G, and if d/$\lambda$=0.64, x/$\lambda$=1.00. That is, the optimum space $S_P$ is $\lambda \times 1.00$. It is thus clear that the space $S_P$ can be increased from 0.82 to 1.00, i.e., by about 1.22 times, when the barium-ferrite magnetic coating material developed in this invention is used in place of the conventional Co-$\gamma Fe_2O_3$ magnetic coating material.

Next, magnetic drums having a diameter of 65 mm (magnetized in 1000 poles, $\lambda$=204 μm, the film thickness d=130 μm) were actually manufactured in the same manner as Example 1 using barium-ferrite magnetic coating material (magnetic powder coercive force Hc=1750 Oe, the proportion of the magnetic powder, 80 wt. % (46.9 vol. %)) and the conventional Co-$\gamma Fe_2O_3$ magnetic coating material (coercive force Hc=690 Oe, the proportion of the magnetic powder, 65 wt. % (31.4 vol. %)). The relationship between the output signal of the magnetic sensor and the space was measured. FIG. 6 shows the results of the comparison. At an output signal of 100 mv, $S_P$ for the Co-$\gamma Fe_2O_3$ magnetic powder is 153 μm, whereas $S_P$ for barium-ferrite is 191 μm, which is about 1.24 times that of the conventional Co-$\gamma Fe_2O_3$ magnetic powder. This result is substantially the same as that of the above-described magnetic field simulation.

As will be apparent from the above, in the coating type magnetic recording member for use in a magnetic encoder according to the present invention, the spacing which generates the maximum output signal of the magnetic sensor can be increased by about 1.2 times when compared with the one which uses a recording medium of conventionally used Co-$\gamma Fe_2O_3$ magnetic powder. Also, the optimum film thickness d which ensures the maximum spacing can be estimated by setting a required surface magnetic field relative to a given magnetizing pitch $\lambda$ and by using the results of the magnetic field simulation. This makes designing of the optimum coating type magnetic recording member for use in a magnetic encoder possible.

What is claimed is:

1. A magnetic encoder comprising:
a non-magnetic substrate which can be moved or rotated;
a film-like magnetic recording medium formed on the substrate including a magnetic coating material which contains barium-ferrite magnetic powder particles, said particles having a mean particle size of 0.2 to 1.5 μm and a coercive force of 1,500 to 3,000 Oe, the medium being magnetically recorded; and
a magnetic sensor arranged to be opposed to the medium.

2. The magnetic encoder according to claim 1, wherein magnetic recording is repetitively conducted on the medium such that $d/\lambda \geq 0.5$ is established, the thickness of the medium being d and when the pitch of the magnetic recording being $\lambda$.

3. A magnetic encoder comprising:
a non-magnetic substrate which can be moved or rotated;
a film-like magnetic recording medium formed on the substrate including a magnetic coating material which contains barium-ferrite powder, wherein the medium has a thickness d and the pitch of the magnetic recording is $\lambda$, the medium being magnetically recorded such that $d/\lambda$ is greater than or equal to 0.5; and
a magnetic sensor arranged to be opposed to the medium.

4. A magnetic encoder comprising:
a non-magnetic substrate which can be moved or rotated;
a film-like magnetic recording medium formed on the substrate including a magnetic coating material which contains 30 vol. % to 65 vol. % of magnetic barium-ferrite particles and a binder resin, the recording medium being magnetically recorded, the medium having a thickness d and a pitch $\lambda$, with $d/\lambda$ being greater than or equal to 0.5, and the barium-ferrite particles have a mean particle size of 0.2 to 1.5 μm and a coercive force of 1,500 to 3,000 Oe.

* * * * *